United States Patent
Oh

(10) Patent No.: US 9,530,406 B2
(45) Date of Patent: Dec. 27, 2016

(54) APPARATUS AND METHOD FOR RECOGNIZING VOICE

(71) Applicant: Hyundai Motor Company, Seoul (KR)

(72) Inventor: Seok Min Oh, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 26 days.

(21) Appl. No.: 14/244,447

(22) Filed: Apr. 3, 2014

(65) Prior Publication Data

US 2015/0149164 A1 May 28, 2015

(30) Foreign Application Priority Data

Nov. 25, 2013 (KR) .................. 10-2013-0144093

(51) Int. Cl.
- *H04R 1/32* (2006.01)
- *G10L 15/20* (2006.01)
- *H04R 3/00* (2006.01)
- *H04R 1/40* (2006.01)
(Continued)

(52) U.S. Cl.
CPC .......... *G10L 15/20* (2013.01); *H04R 3/005* (2013.01); *B60N 2002/0272* (2013.01); *G10L 2021/02166* (2013.01); *H04R 1/326* (2013.01); *H04R 1/406* (2013.01); *H04R 2201/401* (2013.01); *H04R 2201/403* (2013.01); *H04R 2430/20* (2013.01); *H04R 2499/13* (2013.01)

(58) Field of Classification Search
None
See application file for complete search history.

(56) References Cited

U.S. PATENT DOCUMENTS

| | | | | |
|---|---|---|---|---|
| 6,173,059 B1* | 1/2001 | Huang | .................. | H04R 1/406 |
| | | | | 379/202.01 |
| 6,449,593 B1* | 9/2002 | Valve | .................... | G01V 1/001 |
| | | | | 704/233 |
| 9,076,450 B1* | 7/2015 | Sadek | .................... | G10L 15/34 |

(Continued)

FOREIGN PATENT DOCUMENTS

| | | |
|---|---|---|
| JP | 2004-198702 A | 7/2004 |
| JP | 2007-286136 A | 11/2007 |

(Continued)

OTHER PUBLICATIONS

Duraiswami, Rainani, Dmitry Zotkin, and Larry S. Davis. "Active speech source localization by a dual coarse-to-fine search." Acoustics, Speech, and Signal Processing, 2001. Proceedings. (ICASSP'01). 2001 IEEE International Conference on. vol. 5. IEEE, 2001.*

(Continued)

*Primary Examiner* — Pierre-Louis Desir
*Assistant Examiner* — Jonathan Kim
(74) *Attorney, Agent, or Firm* — McDermott Will & Emery LLP

(57) ABSTRACT

An apparatus and a method for recognizing a voice include a plurality of array microphones configured to have at least one microphone, and a seat controller configured to check a position of a seat provided in a vehicle. A microphone controller is configured to set a beam forming region based on the checked position of the seat and controls an array microphone so as to obtain sound source data from the set beam forming region.

4 Claims, 5 Drawing Sheets

(51) Int. Cl.
*G10L 21/0216* (2013.01)
*B60N 2/02* (2006.01)

(56) References Cited

U.S. PATENT DOCUMENTS

| | | | |
|---|---|---|---|
| 2002/0102002 A1* | 8/2002 | Gersabeck | B60R 16/0373 381/110 |
| 2003/0210535 A1 | 11/2003 | Gaides | |
| 2004/0252845 A1* | 12/2004 | Tashev | G01S 3/8034 381/56 |
| 2008/0270131 A1* | 10/2008 | Fukuda | G10L 21/0272 704/246 |
| 2009/0055170 A1 | 2/2009 | Nagahama | |
| 2012/0065973 A1* | 3/2012 | Cho | G10L 21/00 704/246 |
| 2015/0117669 A1* | 4/2015 | Kwon | H04R 3/005 381/86 |

FOREIGN PATENT DOCUMENTS

| | | |
|---|---|---|
| JP | 2008-275881 A | 11/2008 |
| JP | 4225430 B2 | 2/2009 |
| KR | 10-2005-0006238 A | 1/2005 |
| KR | 10-2006-0085392 A | 7/2006 |
| KR | 10-0827080 B1 | 5/2008 |
| KR | 2012-0027718 A | 3/2012 |
| KR | 10-2013-0078919 A | 7/2013 |

OTHER PUBLICATIONS

Duraiswami, Ramani, Dmitry Zotkin, and Larry S. Davis. "Active speech source localization by a dual coarse-to-fine search." Acoustics, Speech, and Signal Processing, 2001. Proceedings. (ICASSP'01). 2001 IEEE International Conference on. vol. 5. IEEE, 2001.*

Chu, W.T., "Detailed Directivity of Sound Fields Around Human Talkers," National Research Council Canada; Dec. 2002.

* cited by examiner

APPARATUS AND METHOD FOR RECOGNIZING VOICE

CROSS-REFERENCE TO RELATED APPLICATION

This application is based on and claims the benefit of priority to Korean Patent Application No. 10-2013-0144093, filed on Nov. 25, 2013 in the Korean Intellectual Property Office, the disclosure of which is incorporated herein in its entirety by reference.

TECHNICAL FIELD

The present disclosure relates to an apparatus and a method for recognizing a voice, and more particularly, to an apparatus for recognizing a voice used for a handsfree apparatus or the like of a vehicle, and an apparatus and a method for recognizing a voice capable of improving a voice recognition rate by changing a beam forming region of an array microphone according to a driver's position.

BACKGROUND

A general apparatus for recognizing a driver's voice, such as a handsfree apparatus or the like of a vehicle is implemented by using a single microphone having directivity toward a driver's seat direction or by using an array microphone for beam-forming toward the driver's seat direction in order to minimize an influence of noise included in the driver's voice.

However, since the driver's voice is generally obtained in a state in which a sitting height of the driver, a position of the driver, and the like are not considered, it may be insufficient to provide high quality call environment.

SUMMARY

The present disclosure has been made to solve the above-mentioned problems occurring in the prior art while advantages achieved by the prior art are maintained intact.

An aspect of the present disclosure provides an apparatus and a method for recognizing a voice capable of more precisely obtaining voice data of a driver by checking a seat position of the driver and setting a beam forming region of an array microphone to the checked position.

According to an exemplary embodiment of the present disclosure, an apparatus for recognizing a voice includes a plurality of array microphones configured to have at least one microphone. A seat controller is configured to check a position of a seat provided in a vehicle. A microphone controller is configured to set a beam forming region based on the checked position of the seat and controls the array microphone so as to obtain sound source data from the set beam forming region.

The microphone controller may recognize a total movement distance of the seat as a total beam forming angle of the array microphone.

The microphone controller may divide the total movement distance of the seat equally into a plurality of sections and further divide the total beam forming angle of the array microphone equally into a plurality of sections according to the divided sections to thereby form first beam forming sections.

The microphone controller may set a section corresponding to the position of the seat among the first beam forming sections as a first beam forming region.

The microphone controller may divide the first beam forming region into a plurality of sections to thereby generate a plurality of second beam forming sections.

The microphone controller may control a first array microphone and a second array microphone so as to obtain sound source data of different sections from the plurality of second beam forming sections.

The microphone controller may set a section from which a signal having the largest strength is obtained among signals of the sound source data obtained from the first array microphone and the second array microphone as a second beam forming region.

The apparatus may further include a voice recognizer extracting voice data from the sound source data obtained from the second beam forming region.

According to another exemplary embodiment of the present disclosure, a method for recognizing a voice includes activating a plurality of array microphones when a signal for entering a voice recognition mode is received from the outside. A position of a seat provided in a vehicle is checked. A beam forming region is set based on the checked position of the seat. Sound source data is obtained from the beam forming region, and voice data is extracted from the obtained sound source data.

The step of checking the position of the seat may include dividing a total movement distance of the seat equally into sections and checking whether the seat is positioned at any position of the divided sections.

The step of setting the beam forming region may include forming first beam forming sections by dividing a total beam forming angle of the array microphone to be equal to sections obtained by dividing the total movement distance. A section is set corresponding to the position of the seat among the first beam forming sections as a first beam forming region.

The method may further include, after the step of setting the section corresponding to the seat position as the first beam forming region, selecting a second beam forming region.

The step of selecting the second beam forming region may include dividing the first beam forming region into a plurality of sections. Sound source data of different sections is obtained from a plurality of second beam forming sections by a first array microphone and a second array microphone. Signal strengths of sound source data obtained from the first array microphone and the second array microphone are compared. A section is selected from which a signal having the largest strength is obtained as a second beam forming region according to the comparison result.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in more detail with reference to the accompanying drawings. However, in describing exemplary embodiments of the present disclosure, technology contents well known in the art to which the present disclosure pertains and directly not related to the present disclosure will be omitted, if possible. This is to more clearly deliver the key point of the present disclosure so as not to obscure the present disclosure by omitting an unnecessary description.

Figure 1:
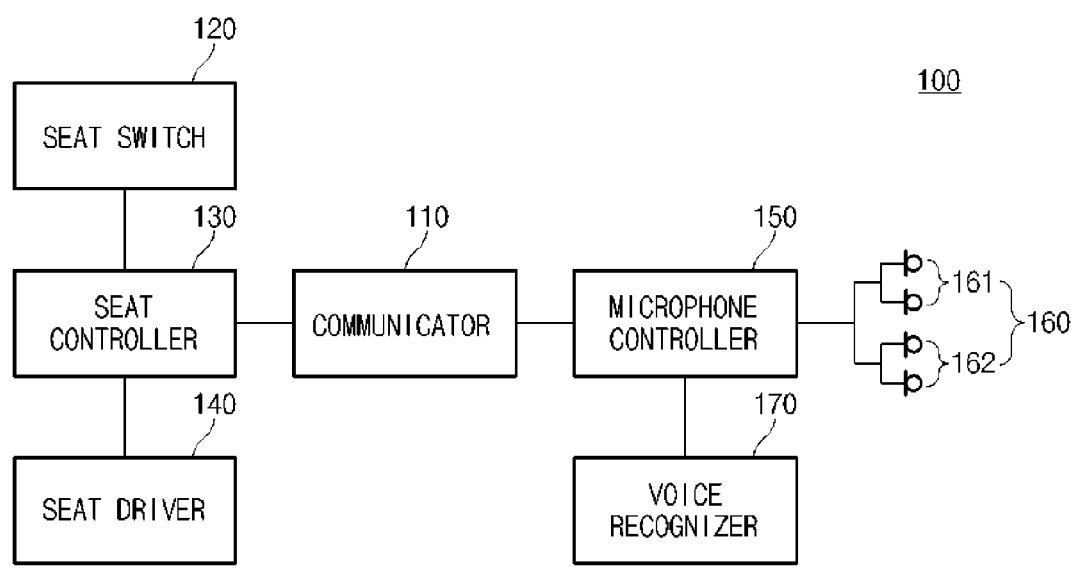
FIG. 1 is a block diagram showing main configurations of an apparatus for recognizing a voice according to an exemplary embodiment of the present disclosure.

FIG. 1 is a block diagram showing main configurations of an apparatus for recognizing a voice according to an exemplary embodiment of the present disclosure.

Referring to FIG. 1, the apparatus 100 for recognizing the voice may include a communicator 110, a seat switch 120, a seat controller 130, a seat driver 140, a microphone controller 150, an array microphone 160, and a voice recognizer 170.

The communicator 110 performs a controller area network (CAN) communication for communication between the seat controller 130 and the microphone controller 150.

The seat switch 120 generates a signal for changing a position of a seat provided in a vehicle and provides the signal to the seat controller 130.

The seat controller 130 controls the seat driver 140 to change the seat position according to the signal provided from the seat switch 120. The seat controller 130 checks current seat position information of the vehicle and provides it to the microphone controller 150. The seat controller 130 divides a total movement distance of the seat into a plurality of sections that are equal and provides information of a section among the plurality of sections in which the seat is positioned to the microphone controller 150.

The seat driver 140 changes the seat position based on a control of the seat controller 130.

The microphone controller 150 receives a signal for entering a voice recognition mode from the outside to thereby activate the array microphone 160. In this case, the signal received from the outside may be received through a separate input (not shown), and the voice recognition mode may be a mode which performs functions such as a handsfree service, an audio, video, and navigation (AVN) control service using a voice recognition, a destination setting service using the voice recognition, and the like.

When the signal for entering the voice recognition mode is received, the microphone controller 150 requests the position information of the seat provided in the vehicle to the seat controller 130 through the communicator 110. The microphone controller 150 checks the position of the seat using the information received from the seat controller 130. The microphone controller 150 sets a first beam forming region based on the checked current seat position. More specifically, the microphone controller 150 determines the total movement distance of the seat as a total beam forming section of the array microphone 160. The microphone controller 150 divides the total beam forming section to be equal to a section which is divided from the total movement distance of the seat. In addition, the microphone controller 150 sets a beam forming section, which corresponds to the section having the seat positioned therein received from the seat controller 130, as the first beam forming region.

The microphone controller 150 divides the first beam forming region into a plurality of second beam forming sections having the same angle. The microphone controller 150 determines a section capable of more precisely obtaining a sound source signal among the second beam forming sections as a second beam forming region. More specifically, the microphone controller 150 controls a first array microphone 161 so as to obtain a sound source signal of a first section among the plurality of second beam forming sections and controls a second array microphone 162 so as to obtain a sound source signal of a second section among the plurality of second beam forming sections. The microphone controller 150 compares the sound source signal (first signal) of the first section and the sound source signal (second signal) of the second section to each other and fixes the first array microphone 161 to a section having a larger signal strength. In this case, when a level of the first signal is larger than that of the second signal, the microphone controller 150 positions the first array microphone 161 in the first section and moves the second array microphone 162 to a third section. If the level of the first signal is smaller than that of the second signal, the microphone controller 150 moves the first array microphone 161 to the second section and moves the second array microphone 162 to the third section. As such, the microphone controller 150 compares sound source signal strengths obtained from the first array microphone 161 and the second array microphone 162, respectively, across the entire second beam forming section. The microphone controller 150 determines a section in which the largest strength of the sound source signal is checked among the plurality of second beam forming sections as the second beam forming region, and positions the first array microphone 161 in the second beam forming region to thereby obtain the sound source signal.

In addition, the microphone controller 150 provides the obtained sound source signal to the voice recognizer 170. As such, the present disclosure may secure a more precise voice recognition performance by changing a position capable of obtaining the sound source signal of the array microphone 160 based on the driver's position.

The array microphone 160 may include the first array microphone 161 and the second array microphone 162. The first array microphone 161 may be a main microphone collecting sound source data, and the second array microphone 162 may be a sub microphone for analyzing the sound source signal for determining an optimal section for collecting the sound source data from the first array microphone 161.

The voice recognizer 170 analyzes the sound source signal provided from the microphone controller 150 to thereby extract voice data. The voice data extracted from the voice recognizer 170 is used for the handsfree service, the audio, video, and navigation (AVN) control service using the voice recognition, the destination setting service using the voice recognition, and the like.

Figure 2:
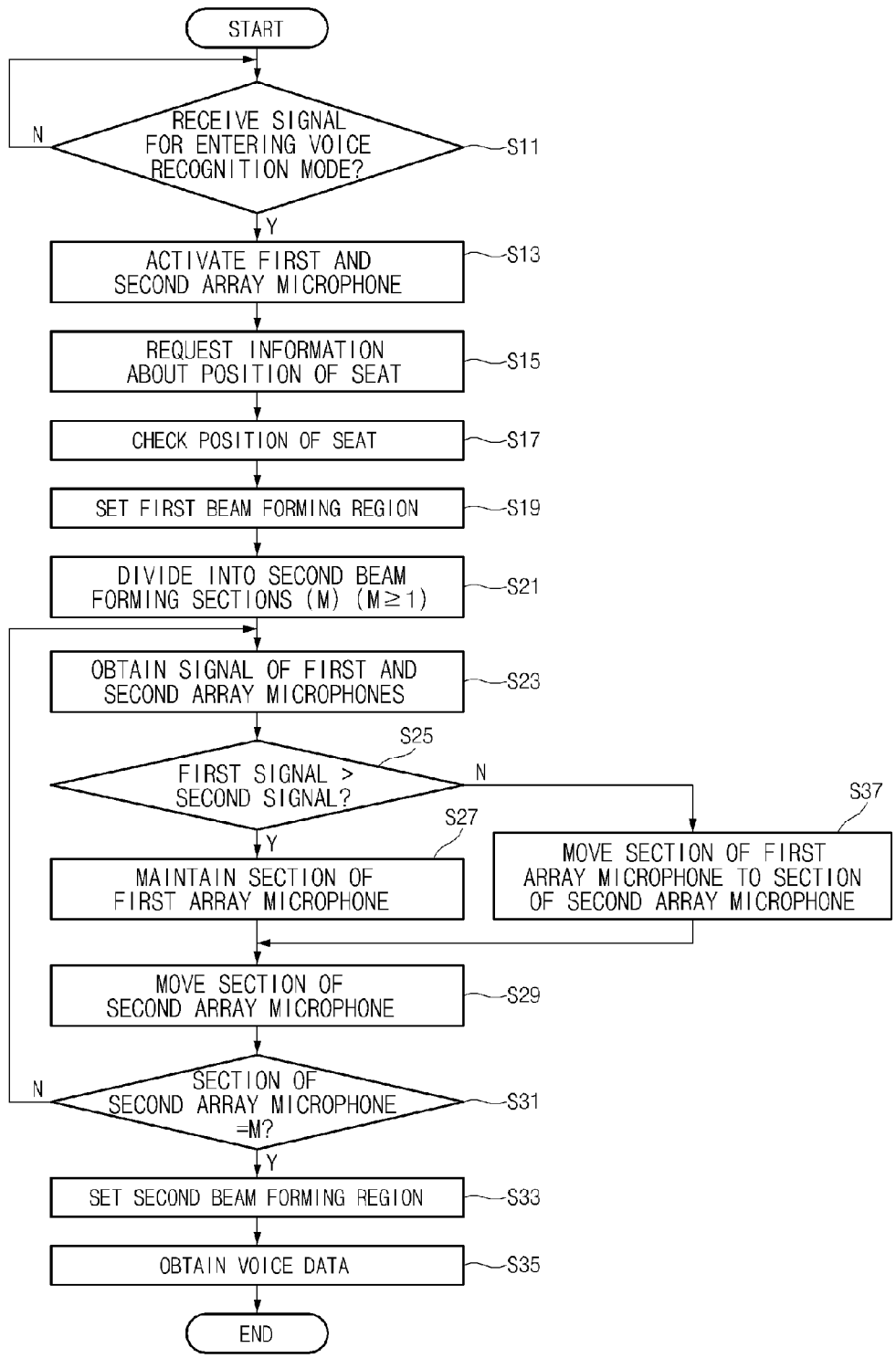
FIG. 2 is a flow chart for describing a method for recognizing a voice according to an exemplary embodiment of the present disclosure.
Figure 3:
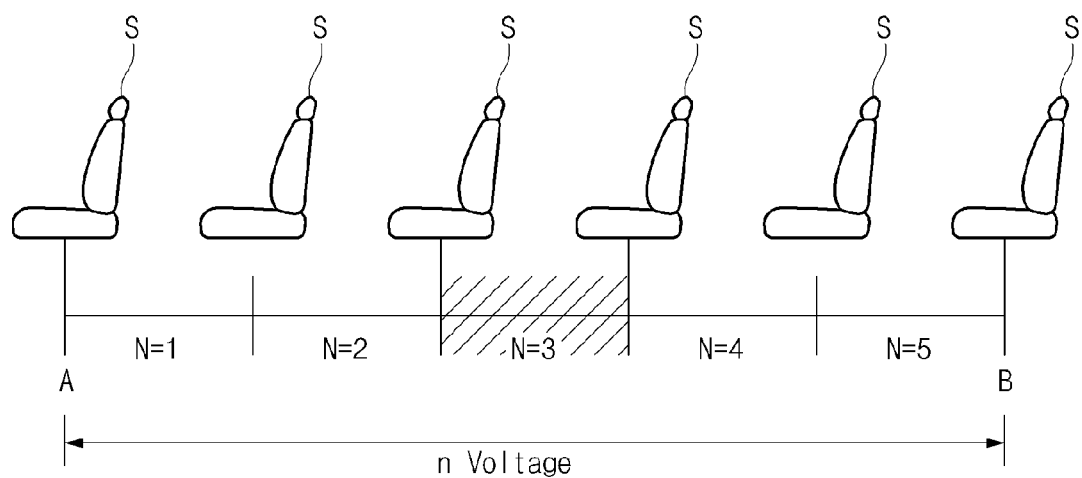
FIGS. 3 to 5 illustrate a method for setting a beam forming region of an array microphone for recognizing a voice according to an exemplary embodiment of the present disclosure.
Figure 4:
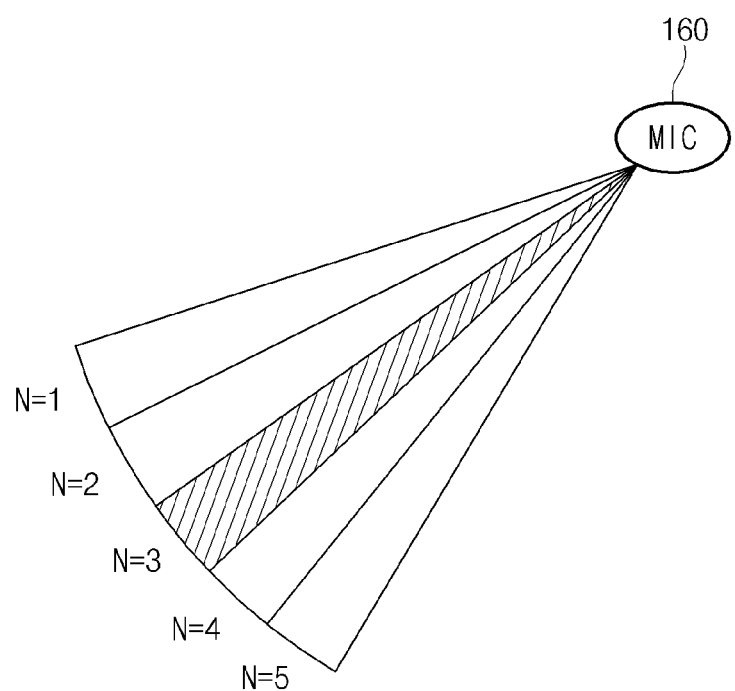
Figure 5:
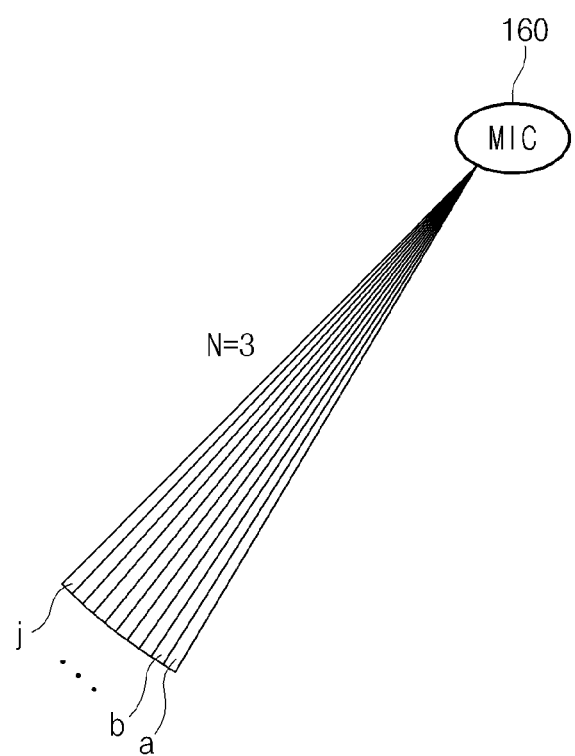

FIG. 2 is a flow chart for describing a method for recognizing a voice according to an exemplary embodiment of the present disclosure. FIGS. 3 to 5 are views for describing a method for setting a beam forming region of an array microphone for recognizing a voice according to an exemplary embodiment of the present disclosure.

Referring to FIGS. 1 to 5, when a signal for entering a voice recognition mode is received from the outside (S11), the microphone controller 150 proceeds to S13. In this case, the signal received from the outside may be received through a separate input (not shown), and the voice recognition mode may be a mode which performs functions such as a handsfree service, an audio, video, and navigation (AVN) control service using a voice recognition, a destination setting service using the voice recognition, and the like.

The microphone controller 150 activates the first array microphone 161 and the second array microphone 162

(S13). The array microphone 160 may be one array microphone 160 formed by two microphones.

The microphone controller 150 requests information about the position of the seat provided in the vehicle to the seat controller 130 through the communicator 110 (S15). The microphone controller 150 checks the seat position using the information received from the seat controller 130 (S17). Referring to FIG. 3, a seat S provided in the vehicle moves from a point A to a point B. The seat controller 130 divides a movement distance equally from the point A to the point B into a section. The seat controller 130 may define the movement distance of the seat S from the point A to the point B as an n voltage and may check the changed current position of the seat S by a voltage level input from the seat switch 120. In this case, the voltage level may be generally classified into five sections as shown in FIG. 3, and a voltage value for each section is 0, n/5, 2n/5, 3n/5, 4n/5, and n sequentially from the point A to the point B. The seat controller 130 provides an N value mapped to the voltage value at which the seat S is positioned to the microphone controller 150 through the communicator 110.

The microphone controller 150 sets the first beam forming region (S19). More specifically, describing with reference to FIGS. 3 and 4, the microphone controller 150 determines the movement distance from the point A to the point B of the seat S as the total beam forming section of the array microphone 160. The microphone controller 150 equally divides the total beam forming section into five sections as shown in FIG. 3. In addition, the microphone controller 150 sets a beam forming section corresponding to the N value mapped to the voltage value of the position of the seat S received from the seat controller 130 as the first beam forming region. For example, when the microphone controller 150 receives a value of 3 corresponding to the N value of the position of the seat S from the seat controller 130, it sets a section corresponding to the value of 3 in the total beam forming section as the first beam forming region.

The microphone controller 150 then divides the first beam forming region into M second beam forming sections having the same angle (S21). Thereby, the present disclosure may precisely check the position of the seat S, thereby improving performance of the voice recognition of the driver. The division of the second beam forming section may be shown as in FIG. 5. The region corresponding to N=3, which is the first beam forming region, may be divided into a total of 10 second beam forming sections. In this case, as the division of the second beam forming section is finely performed, voice data of the driver may be precisely obtained.

Proceeding to S23, the microphone controller 150 obtains the sound source signal in each of the M divided second beam forming sections from the first array microphone 161 and the second array microphone 162. Referring to FIG. 5, the microphone controller 150 controls the array microphone 160 so as to obtain the sound source signals in the second beam forming section corresponding to a reference numeral a and the second beam forming section corresponding to a reference numeral b among the 10 divided second beam forming sections.

The microphone controller 150 compares the level of the first signal obtained from the section corresponding to the reference numeral a and the level of the second signal obtained from the section corresponding to the reference numeral b to each other (S25). As a result of the comparison, when the level of the first signal is larger than that of the second signal, the microphone controller 150 proceeds to S27, and when the level of the second signal is larger than that of the first signal, the microphone controller 150 proceeds to S37.

As a result of the step S25, when the level of the first signal is larger than that of the second signal, the microphone controller 150 proceeds to S27 to thereby fix the first array microphone 161 to the section corresponding to the reference numeral a and obtain the first signal from the section corresponding to the reference numeral a. The microphone controller 150 controls the array microphone 160 so that the second array microphone 162 obtains the second signal from the second beam forming section corresponding to a reference numeral c (S29).

Proceeding to S31, when the second beam forming section in which the second array microphone 162 obtains the sound source signal is not a reference numeral j, the microphone controller 150 returns to S23 and repeats the above operations. On the contrary, when the second beam forming section in which the second array microphone 162 obtains the sound source signal is the reference numeral j, the microphone controller 150 proceeds to S33.

When the second array microphone 162 obtains the second signal until the second beam forming section corresponding to the reference numeral j, the microphone controller 150 recognizes the second beam forming section to which the first array microphone 161 is fixed as a section having the largest strength of the sound source signal, and determines it as the second beam forming region (S33). The microphone controller 150 controls the voice recognizer 170 to obtain voice data by providing the sound source signal obtained from the section determined as the second beam forming region to the voice recognizer 170 (S35).

As a result of the check of S25, when the level of the first signal is smaller than that of the second signal, the microphone controller 150 proceeds to S37 to thereby control the first array microphone 161 so as to obtain the first signal from the second beam forming section corresponding to the reference numeral b. Further, the microphone controller 150 proceeds to S29 to thereby control the second array microphone 162 so that the second array microphone 162 obtaining the second signal from the second beam forming section corresponding to the reference numeral b obtains the second signal from the second beam forming section corresponding to the reference numeral c.

Describing with reference to FIG. 5, a signal of the section a is obtained from the first array microphone, and a signal of the section b is obtained from the second array microphone. By comparing the signals of the sections a and b, when the level of the signal of the section a is larger than that of the signal of the section b, the first array microphone continuously obtains the signal of the section a, and the second array microphone obtains the signal of the section c.

When a signal strength of the section c is larger than that of the section a, the first array microphone moves from the section a to section c to thereby obtain the signal of the section c, and the second array microphone obtains a signal of a section d. When the signal strength of the section c is larger than that of the section d, the first array microphone continuously obtains the signal of the section c, and the second array microphone obtains a signal of a section e.

As such, the second array microphone obtains the signal while sequentially changing the section from the section b to the section j until the signal of the section j is obtained. The first array microphone compares the signal strength obtained from the first array microphone and the signal strength obtained from the second array microphone to each other to thereby change and fix the beam forming region to the section having large signal strength.

According to an exemplary embodiment of the present disclosure, voice data of the driver may be more precisely obtained by checking the seat position of the driver and setting the beam forming region of the array microphone to the checked position to obtain voice data of the driver.

Hereinabove, the apparatus and the method for recognizing the voice according to the exemplary embodiments of the present disclosure have been described with reference to the exemplary embodiment of the present disclosure. The exemplary embodiments of the present disclosure have been disclosed in the present specification and the accompanying drawings and specific terms have been used, but are just used in a general meaning in order to easily describe the technical content of the present disclosure, assist in understanding the present disclosure, and do not limit the scope of the present disclosure. It is obvious to those skilled in the art to which the present disclosure pertains that various modifications may be practiced based on the technical idea of the present disclosure, in addition to the exemplary embodiments disclosed herein.

What is claimed is:

1. An apparatus for recognizing a voice, the apparatus comprising:
    a plurality of array microphones configured to have at least one microphone;
    a seat controller configured to check a position of a seat provided in a vehicle; and
    a microphone controller configured to set a beam forming region based on the checked position of the seat and control the array microphones so as to obtain sound source data from the set beam forming region,
    wherein the microphone controller recognizes a total movement distance of the seat as a total beam forming angle of the array microphones,
    wherein the microphone controller divides the total movement distance of the seat equally into a plurality of sections and divides the total beam forming angle of the array microphones equally into a plurality of sections according to the divided sections to thereby form first beam forming sections,
    wherein the microphone controller sets a section corresponding to the seat position among the first beam forming sections as a first beam forming region,
    wherein the microphone controller divides the first beam forming region into a plurality of sections to thereby generate a plurality of second beam forming sections, and
    wherein the microphone controller compares each of the plurality of second beam forming sections and sets a section from which a signal having the largest strength is obtained among signals of sound source data obtained from a first array microphone and a second array microphone as a second beam forming region.

2. The apparatus according to claim 1, further comprising a voice recognizer extracting voice data from the sound source data obtained from the second beam forming region.

3. A method for recognizing a voice, the method comprising:
    activating a plurality of array microphones when a signal for entering a voice recognition mode is received from the outside;
    checking a position of a seat provided in a vehicle;
    setting a beam forming region based on the checked position of the seat;
    obtaining sound source data from the beam forming region; and
    extracting voice data from the obtained sound source data,
    wherein a total movement distance of the seat is recognized as a total beam forming angle of the array microphones,
    wherein the step of checking the seat position includes dividing the total movement distance of the seat equally into sections and checking whether the seat is positioned at any position of the divided sections,
    wherein the step of setting the beam forming region includes: forming first beam forming sections by dividing the total beam forming angle of the array microphones to be equal to the sections obtained by dividing the total movement distance; and setting a section corresponding to the seat position among the first beam forming sections as a first beam forming region,
    wherein a second beam forming region is selected after the section corresponding the seat position among the first beam forming sections are set as a first bean forming region,
    wherein the step of selecting the second beam forming region includes: dividing the first beam forming region into a plurality of sections; obtaining, by a first array microphone and a second array microphone, sound source data of different sections from a plurality of second beam forming sections; comparing strengths of sound source data signals obtained from the first array microphone and the second array microphone; and selecting a section from which a signal having the largest strength is obtained as the second beam forming region according to the comparison result after comparing each of the plurality of second beam forming sections.

4. The apparatus according to claim 1, further comprising:
    a seat switch generating a signal for changing the seat position and providing the signal to the seat controller; and
    a seat driver configured to change the seat position based on a control of the seat controller.

* * * * *